United States Patent [19]

Ward, Jr.

[11] Patent Number: 4,663,574
[45] Date of Patent: May 5, 1987

[54] REACTIVE POSITION DETECTOR FOR ELECTROMAGNETIC VIBRATORS

[75] Inventor: William H. Ward, Jr., Costa Mesa, Calif.

[73] Assignee: Dresser Industries, Inc., Dallas, Tex.

[21] Appl. No.: 802,673

[22] Filed: Nov. 29, 1985

Related U.S. Application Data

[63] Continuation-in-part of Ser. No. 536,402, Sep. 27, 1983, abandoned.

[51] Int. Cl.$^4$ .............................................. H02K 33/02
[52] U.S. Cl. .................................... 318/128; 318/132; 310/29
[58] Field of Search ................. 361/154; 310/29, 27, 310/28, 18; 318/114, 127-133, 118, 116

[56] References Cited

U.S. PATENT DOCUMENTS

| | | | |
|---|---|---|---|
| 2,273,912 | 2/1942 | Doyle | 172/240 |
| 2,287,406 | 6/1942 | Baird | 172/240 |
| 3,128,911 | 4/1964 | Morris et al. | 222/52 |
| 3,142,011 | 7/1964 | Shieh | 318/133 |
| 3,400,316 | 9/1968 | Kuschel | 318/114 |
| 3,434,586 | 3/1969 | Morris | 198/220 |
| 3,447,051 | 5/1969 | Attwood et al. | 318/127 |
| 3,477,281 | 11/1969 | Helmuth | 73/71.6 |
| 3,654,540 | 4/1972 | Honig et al. | 318/118 |
| 3,671,814 | 6/1972 | Dick | 361/154 |
| 3,748,553 | 7/1973 | Reiner | 310/274 |
| 3,908,138 | 9/1975 | Shieh | 310/29 |
| 3,930,174 | 12/1975 | Shieh | 310/29 |
| 4,049,997 | 9/1977 | McGhee | 318/128 |
| 4,216,416 | 8/1980 | Grace | 318/128 |
| 4,303,870 | 12/1981 | Nakamura et al. | 318/130 |

FOREIGN PATENT DOCUMENTS 2086003  5/1982  United Kingdom .

Primary Examiner—Donovan F. Duggan

[57] ABSTRACT

A method of and apparatus for measuring the vibration amplitude of an electromagnetic vibratory motor is disclosed in which the current induced in the coils of the motor is sensed and differentiated and applied to dividing means where it is divided by the sensed induced voltage induced in the coils to produce a signal proportional to the instantaneous reluctance of the coils of the vibratory motor. The instantaneous reluctance signal is filtered to remove the line frequency harmonic therein, and this filtered signal is peak detected to produce the vibration amplitude signal. Means are also provided to eliminate the problem associated with the dividing means if the sensed induced voltage approaches zero.

10 Claims, 1 Drawing Figure

4,663,574

REACTIVE POSITION DETECTOR FOR ELECTROMAGNETIC VIBRATORS

CROSS-REFERENCES TO RELATED APPLICATIONS

This application is a continuation-in-part of application Ser. No. 536,402 filed Sept. 27, 1983 now abandoned.

The subject matter of this application is also related to a concurrently filed application Ser. No. 810,764 filed Dec. 19, 1985, entitled "ELECTRO-INDUCTIVE VIBRATORY MONITORING SYSTEM" which is a continuation-in-part of application Ser. No. 536,405 filed Sept. 27, 1983 now abandoned, which related applications are assigned to the same assignee as this application. The disclosures of said applications are incorporated herein by reference.

BACKGROUND OF THE INVENTION

The present invention relates to systems for controlling vibratory motors. More specifically, the present invention is directed to a method of and apparatus for monitoring the vibration amplitude of a vibratory feeder system by measuring the current and voltage utilized by the vibratory motor.

The vibratory feeders with which the present invention is to be used are well known in the art. In a typical construction of such a vibratory feeder, an electromagnetic vibrating motor is utilized in conjunction with a feed trough. The mass to be transported, such as coal or other bulky material, is moved along the feed trough by the action of the vibratory motor. Such electromagnetic vibrators suitable for use with this invention are described in commonly assigned U.S. Pat. Nos. 3,908,138 and 3,930,174, the disclosures of which are hereby incorporated by reference.

In order to control the action of a vibratory feeder, it is necessary to monitor and control the vibration and amplitude of the motor driving the feeder. Such monitoring and control results in a uniform capacity carried by the feeder and prevents overstroke of the electromagnetic vibrator itself. Such overstroke can cause self-destruction of the electromagnetic feeder.

As is well known, such vibratory feeders usually operate on the principle of resonance. By utilizing judicious design procedures, the mass M and spring rate K of the feeder are so proportioned that the resonant frequency of the vibratory feeder is close to its excitation frequency. This produces the minimum power requirement to operate the feeder.

However, during operation, both M and K may change. For example, the mass M might increase because of build-up of material on the deck of the feeder or the spring rate K might decrease because of higher environmental temperature conditions. These changes in M and K will result in a shifting of the system resonant frequency, thus causing an irregular or varying vibration amplitude.

Another source of irregularity may come from the line voltage, the fluctuation of which will vary vibration amplitude.

Heretofore, a motion transducer, such as an accelerometer or velocity pick-up, was installed on the vibration deck in order to aid in stabilizing the vibration amplitude. The transducer was connected by a cable to the controller of a regulatory feedback loop system. Such a feedback system is disclosed in U.S. Pat. No. 2,273,912. By monitoring the resonant frequency of the vibratory feeder, the vibration amplitude of the feeder could be modified to compensate for the changes in mass M and spring rate K. However, such an approach created substantial maintenance problems in that the environment surrounding the transducer was frequently filled with dust particles and other, larger solid particles. In addition, the constantly vibrating environment created additional instrumentation problems. Furthermore, the initial cost of the motion transducer and cable and the cost of maintaining both in proper operating condition in such a harsh environment was substantial.

Another prior art approach is to vary the frequency of vibration, as well as the vibratory current, in a closed loop control system, to regulate the amplitude of vibration, for instance, as shown in U.S. Pat. Nos. 3,447,051 and 3,748,583. However, it is likely to be costly to build and maintain such a complex system, especially relating to a large power vibrator where the need often arises to convey tens of thousands of tons of bulk materials per day.

SUMMARY AND OBJECTS OF THE INVENTION

In view of the foregoing, it should be apparent that there still exists a need in the art for a method of and apparatus for monitoring and regulating the vibration amplitude of a vibratory feeder in which the limitations caused by the harsh environment of use of such feeders are avoided. It is, therefore, a primary object of this invention to provide a method of and apparatus for monitoring and controlling an electromagnetic vibratory feeder which utilizes the voltage and current supplied to the vibratory motor of the feeder to establish a vibration signal representative of the vibration amplitude.

More particularly, it is an object of this invention to provide monitoring apparatus as aforementioned having simple and reliable electronic circuitry which does not require frequent maintenance nor costly components.

Still more particularly, it is an object of this invention to provide monitoring apparatus for monitoring the vibration amplitude of an electromagnetic vibratory feeder which is characterized by simple electronic circuitry as is not subject to the harsh operating environment in which such vibratory feeders are used.

Still more particularly, it is an object of this invention to provide mathematical guidance for building such monitoring apparatus.

Briefly described, these and other objects of the invention are accomplished by providing apparatus which senses and then differentiates the current induced in the coil or coils of an electromagnetic vibratory motor. The voltage across the coil or coils is also sensed. Both the differentiated current signal and the voltage signal are provided to a divider. The divider divides the current signal by the voltage signal and produces an output signal proportional to the reluctance dH/dB of the vibratory motor. A zero crossing detector circuit is connected to receive the sensed voltage signal and to open an electronic switch, connected to the output of the divider, when the voltage signal approaches zero. This eliminates the problem of the instantaneous voltage going through zero by bypassing the zero moments.

The output from the electronic switch is fed to a low pass filter in order to remove the 60 Hz voltage component of the power supplied to the vibratory motor. A peak-to-peak detector, which may be a rectifier, is connected to the output of the low pass filter and produces the desired vibration amplitude signal at its output. This signal may optionally be utilized with set-point value and/or alarm circuits for further monitoring or control purposes or may then be used to control the operation of the vibratory motor and hence the vibratory feeder.

DETAILED DESCRIPTION OF THE PREFERRED EMBODIMENT

Figure 1:
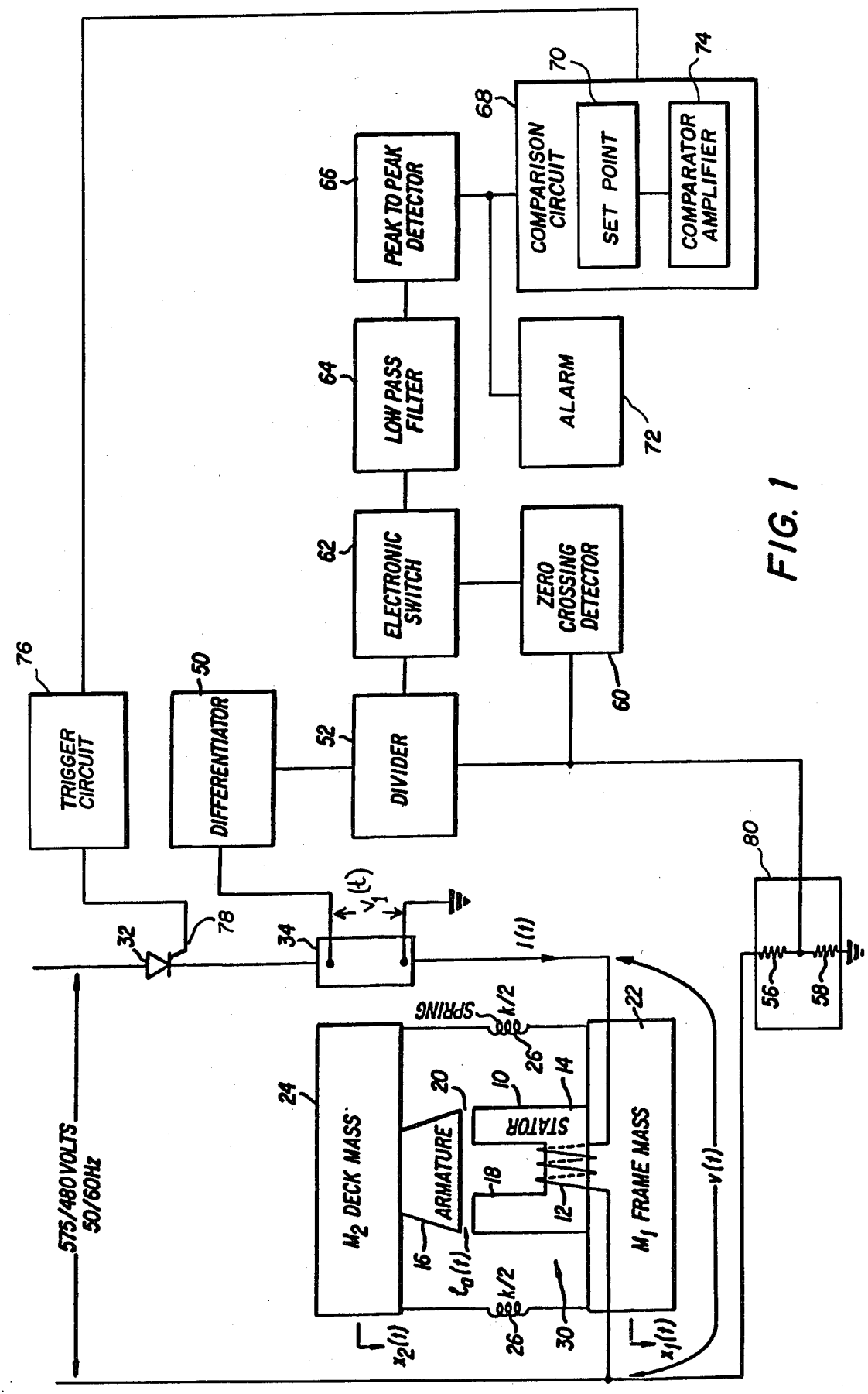
FIG. 1 is a system block diagram of the present invention.

Referring now in detail to the drawing, there is illustrated in FIG. 1 an electromagnetic vibratory motor 30 comprising a U-shaped stator 10 having a series of turns of wire comprising a coil 12 wound about its base or iron path 14 or two coils (not shown), each wound around a leg 18. An armature 16 is separated from the top of the legs 18 of the stator 10 by an air gap 20.

The electromagnetic vibratory motor 30, which is comprised primarily of the stator 10, coil 12, armature 16 and air gap 20, is mounted between the frame 22 and the deck 24, of for example, a typical vibratory feeding trough, such as a trough manufactured by the Jeffrey Manufacturing Division of Dresser Industries, Inc., Woodruff, S.C. 29388. The mass of each of the frame 22 and deck 24 can be represented by $M_1$ and $M_2$, respectively. A spring 26 having a spring constant K completes the electromechanical representation of a typical electromagnetic vibratory motor installation. The spring 26 is shown divided in two for illustrative purposes. Thus, each spring 26 as shown has a spring constant of $K/2$.

The vibratory motor 30 is connected to a source of electrical energy, for instance 575 or 480 volts AC of 50 or 60 Hz, through a diode or SCR 32. One side of the coil 12 is connected to the cathode of the SCR or diode 32 through a resistor 34 and the other end of the coil 12 is connected to one side of the power source. The anode of the diode or SCR is connected to the other side of the power source. Thus, when the diode or SCR 32 conducts current, the electromagnetic vibratory motor 30 is caused to vibrate or oscillate at a determinable rate and at the line frequency.

When this occurs, the frame 22 will be vibrating at a rate $X_1(t)$ and the deck 24 will be vibrating at a rate $X_2(t)$. Assuming the inductance of the coil 12 is large, and the resistance of the coil is small, the voltage across the coil 12 will be equal to the line voltage or $V(t)$, and the current through the coil 12 will be equal to $i(t)$. In order to obtain the desired result, that is, the peak-to-peak vibration amplitude of the deck 24, the present invention utilizes the reluctance of the vibratory motor 30. This can be expressed as $dH/dB$. H is the magnetizing force in the magnetic circuit, which comprises the stator iron associated with the $M_1$ frame mass 22, the armature iron associated with the $M_2$ deck mass 24 and the air gap 20 therebetween. Since H is proportional to the ampere-turns associated with the coil 12 and since the number of coil turns on the stator is constant, H is therefore proportional to the current $i(t)$.

B is the flux density. If the small resistance drop across the coil 12 is neglected, the terminal voltage $v(t)$ across the coil 12 is proportional to the induced voltage. The induced voltage is in turn proportional to $dB/dt$, the time rate of change of the flux density. Thus, a signal whose value is proportional to H is present, as well as a signal whose value is proportional to the time rate of change of the flux density $dB/dt$. In order to obtain the desired $dH/dB$ signal, the derivative of the magnetizing force or magnetomotive force (MMF) or $dH/dt$ must be determined. Thus, the MMF signal H is differentiated to obtain $dH/dt$ and this value is divided by the time rate of change of the flux density signal $dB/dt$ to obtain the desired expression $dH/dB$.

The reluctance in a magnetic circuit is also proportional to the air gap if the effect of the iron of the stator is neglected. Since the difference between the minimum and maximum values of the air gap is directly proportional to the vibration amplitude of the vibratory motor 30, the calculation of this value will provide the desired amplitude value.

Since the current $i(t)$ through the coil 12 is proportional to H, and the voltage $v(t)$ across the coil 12 is proportional to $dB/dt$, these values can be obtained by measuring the current and voltage induced in the coil. Furthermore, the resulting incremental magnetic flux is equal to $dH/dB$. Thus, if the time rate of change of the current is divided by the voltage, the result is proportional to the instantaneous value of the air gap. Therefore, $dH/dt$ divided by $dB/dt$ equals $dH/dB$. Since $dH/dB$ is proportional to the reluctance and hence to the air gap, this signal can be used for closed loop control of the vibrational amplitude as well as determining the amplitude itself.

Since the reluctance and the air gap are proportional to $dH/dB$, the frequency of vibration need not be known. Furthermore, it does not matter whether the magnetizing force H or the flux density B has a direct current component, or if the resulting waveforms are complex.

The cathode of the SCR 32 is connected to one side of a resistor 34. The other pole of the resistor 34 is connected to one side of the coil 12. The current $i(t)$ induced in the coil 12 is measured across the resistor. Since $i(t)$ is proportional to the voltage $v_1(t)$ which is proportional to the magnetomotive force H, differentiating the current signal measured at the resistor 34 will yield a signal equal to $dV/dt$. This differentiation is performed by differentiator 50. Since, as already explained, $v_1(t)$ is proportional to H, so also is $dv_1/dt$ proportional to $dH/dt$.

A resistor dropping circuit 80 is connected to receive the voltage $v(t)$ induced in the coil 12. The circuit 80 is connected to the opposite pole of the coil 12 than the resistor 34, through a resistor 56. The other side of the resistor 56 is connected to ground through a second resistor 58. These two dropping resistors 56 and 58 function to provide a voltage less than 575/480 v to the divider 52 and zero crossing detector. Since the voltage $v(t)$ is proportional to $dB/dt$, the divider 52 thus divides $dH/dt$ by $dB/dt$. The result is $dH/dB$, which, as previously explained, is proportional to the reluctance and is equal to the instantaneous reluctance.

A zero crossing detector 60 is also connected to one pole of the coil 12 through resistor 56 in order to receive the $dB/dt$ signal. The zero crossing detector is connected to an electronic switch 62. When the $dB/dt$ signal approaches zero, the zero crossing detector causes the normally closed electronic switch to open. Since electromagnetic vibratory feeders do utilize AC quantities, the use of the zero crossing detector 60 and an electronic switch 62 eliminate any problems associated with very small values of dB/dt, the denominator of the divider 52.

The output from the electronic switch 62 is connected to the input of a low pass filter 64. This filter 64 functions to remove the harmonic components associated with the power source from the instantaneous reluctance signal dH/dB. The output of the filter 64 is fed to a peak-to-peak detector to produce a vibration amplitude signal in its usually expressed peak-to-peak form. The thus determined vibration amplitude signal is connected to a comparison circuit 68. This circuit 68 includes a set-point value circuit 70 which compares the vibration amplitude signal with a predetermined set-point value, and a comparator amplifier circuit 74. The output of the comparison circuit 68 is connected to trigger circuit 76 which delivers gating pulses to gate 78 of SCR 32. The vibration amplitude signal may be optionally fed to an alarm circuit 72 for producing an indication, such as a flashing red light or audible alarm, when the vibration amplitude signal bears some predetermined relationship to the set-point value. Alternatively, either of the set-point value or alarm circuits may function to turn-off the vibratory motor 30.

From the foregoing description, it will be understood by those skilled in the art that the present invention provides a method of and apparatus for monitoring the vibration amplitude of an electromagnetic vibratory motor by monitoring the voltage and current induced in the motor and producing a control signal therefrom.

Although only a preferred embodiment is specifically illustrated and described herein, it will be appreciated that many modifications and variations of the present invention are possible in light of the above teachings and within the purview of the appended claim without departing from the spirit and intended scope of the invention.

What is claimed is:

1. Apparatus for controlling the vibration amplitude of an electromagnetic vibratory motor, said motor comprising an electromagnet having at least one coil adapted to be connected to a source of high voltage electrical energy, comprising:

means for sensing the current induced in said coil during operation of said vibratory motor;

means for sensing the voltage induced in said coil during operation of said vibratory motor;

differentiating means for receiving said sensed induced current and for producing a first differential signal proportional to the time rate of change of the magnetomotive force of said vibratory motor;

dividing means for receiving said sensed induced voltage and said first differential signal and for generating a second differential signal proportional to said vibration amplitude by dividing said first differential signal by said sensed induced voltage; and triggering means connected to receive said second differential signal for controlling the operation of said vibratory motor.

2. The apparatus of claim 1, wherein said triggering means comprises:

comparison circuit means for comparing said second differential signal to a predetermined desired set point for producing an output signal when said second differential signal differs from said set-point; and triggering circuit means for receiving said output signal and controlling operation of said vibratory motor in accordance therewith.

3. The apparatus of claim 1, further including:

zero crossing detector means receiving said sensed induced voltage for providing a zero crossing signal when said sensed induced voltage approaches zero; and switching means connected to said dividing means and said zero crossing detector means for providing said second differential signal as signal unless it is receiving a zero crossing signal.

4. The appratus of claim 3, further including low pass filter means connected to said switching means for removing the harmonics of the line frequency from said second differential signal.

5. The apparatus of claim 3, further including peak detecting means connected to said low pass filter means for detecting the peak-to-peak amplitude of the filtered second differential signal.

6. The apparatus of claim 5, wherein said peak detecting means comprises rectifying means.

7. Apparatus for controlling the vibration amplitude of an electromagnetic vibratory motor, said motor comprising an electromagnet having at least one coil adapted to be connected to a source of electrical energy comprising:

means for sensing the current and voltage drawn by said vibratory motor during the operation thereof;

first and second means connected to said sensing means for producing respectively a first differential signal di/dt and a second differential signal dB/dt, said first differential signal di/dt being proportional to the differential of magnetomotive force dH/dt of the vibratory motor and said second differential signal being proportional to the instantaneous voltage of said vibratory motor during the operation thereof;

divider means for dividing said first differential signal dH/dt by said second differential signal dB/dt to obtain a divided differential signal dH/dB, proportional to the instantaneous reluctance of said vibratory motor, zero crossing detector means, connected to receive said second differential signal dB/dt and to produce a zero crossing signal when said second differential signal dB/dt approaches zero;

switching means connected to receive said divided differential signal and said zero crossing signal;

low pass filter means connected to said switching means for filtering said divided differential signal to remove the line frequency harmonics thereof, said switching means operating to transmit said received divided differential signal to said filter means unless it is receiving said zero crossing signal from said zero crossing detector means;

peak detector means, connected to said filter means, for detecting the peak-to-peak amplitude of said divided differential signal after it passes through said filter means to obtain an output signal proportional to the vibration amplitude of said vibrating motor; and means for receiving said output signal for controlling said vibratory motor.

8. A method for determining the amplitude of vibration of an electromagnetic vibratory motor, said motor comprising an electromagnet having at least one coil adapted to be connected to a source of electrical energy, comprising the steps of:
  sensing the current induced in said coil during operation of said vibratory motor;
  sensing the voltage induced in said coil during operation of said vibratory motor;
  differentiating said induced current to produce a first differential signal; and
  dividing said first differential signal by said induced voltage to produce a second differential signal proportional to the vibration amplitude of said vibratory motor.

9. The method of claim 8, further including the step of filtering said second differential signal to remove the line frequency harmonics therefrom.

10. The method of claim 9, further including the step of detecting said filtered second differential signal to produce a peak-to-peak vibration amplitude signal.

* * * * *